April 28, 1959
J. M. HOLAHAN, JR
2,884,211
FISHING REEL GUARD
Filed Feb. 17, 1954
2 Sheets-Sheet 1
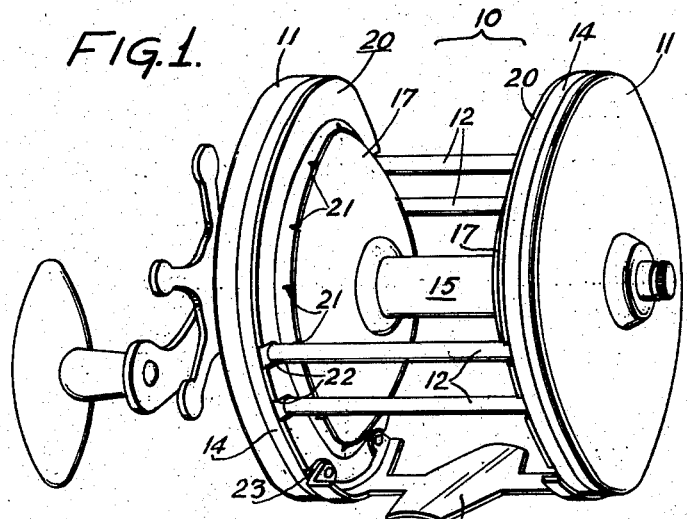
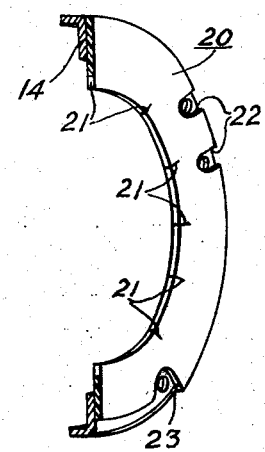
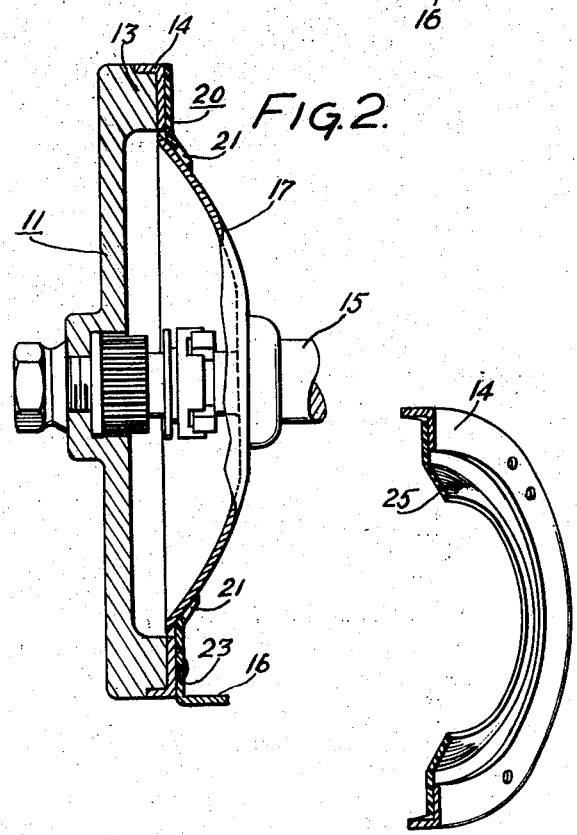
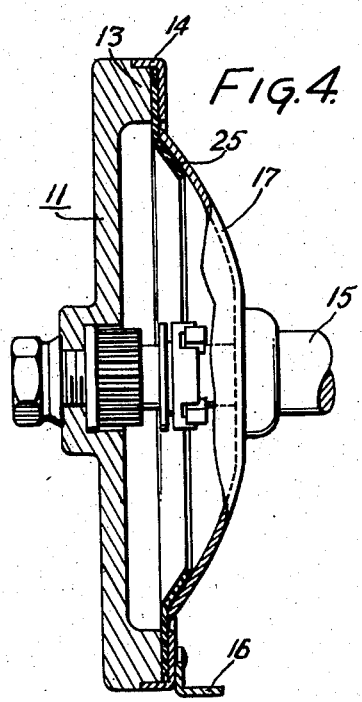
Inventor:
Joseph M. Holahan, Jr.
by his Attorneys
Howson &
Howson April 28, 1959 J. M. HOLAHAN, JR 2,884,211
FISHING REEL GUARD
Filed Feb. 17, 1954 2 Sheets-Sheet 2
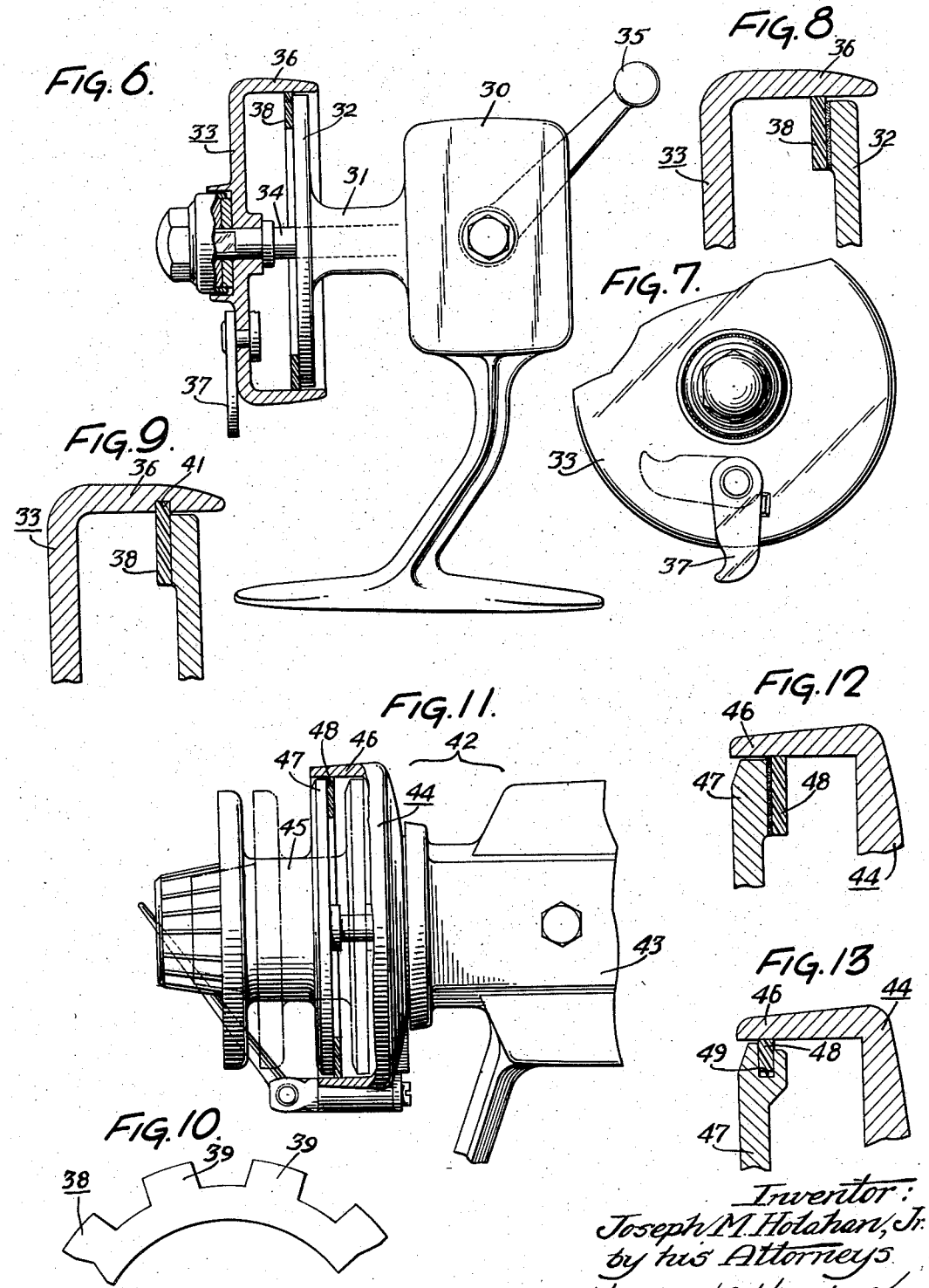
Inventor:
Joseph M. Holahan, Jr.
by his Attorneys
Howson & Howson United States Patent Office 2,884,211
Patented Apr. 28, 1959

2,884,211

FISHING REEL GUARD

Joseph M. Holahan, Jr., Philadelphia, Pa., assignor to True Temper Corporation, a corporation of Ohio Application February 17, 1954, Serial No. 410,828

2 Claims. (Cl. 242—84.1)

The present invention relates to new and useful improvments in finishing reel guards and more particularly to guards for preventing the line carried by the reel from passing through the clearance space between the edge of the spool and an adjoining portion of the reel. This application is a continuation-in-part of my copending application Serial No. 362,260, filed June 17, 1953, now abandoned.

The principal object of the present invention is to provide a novel guard for fishing reels which will prevent the fishing line from passing through the clearance space between the edge of the spool and the adjoining portion of the reel. A guard of this type is particularly necessary when mono-filament line is used on the reel as monofilament line may have a diameter as small as 0.008 inch, and it is impossible to mass produce a fishing reel having clearances less than this dimension. Thus, it is very easy for line of this type to become caught in the reel and and interfere with the use of the reel.

Another object of the present invention is to provide a novel guard for fishing reels which may be installed on a reel either during or after the manufacture thereof and is equally adapted for use with both new and presently existing reels.

A further object of the present invention is to provide a novel guard for fishing reels which is carried by a portion of the reel and bears against the spool to prevent the fishing line from passing between the spool and the adjoining portion of the reel and does not exert a sufficient drag to interfere with casting.

A still further object of the present invention is to provide a novel guard for fishing reels having the features and characteristics set forth which may be manufactured easily and cheaply and is entirely efficient and effective in operation and use.

These and other objects of the present invention and the various features and details of the operation and construction thereof are hereinafter more fully set forth and described with reference to the accompanying drawings in which:

Fig. 1 is a perspective view of a fishing reel embodying the guard of the present invention;

Fig. 2 is an enlarged fragmentary sectional view through one end of the fishing reel illustrated in Fig. 1 illustrating the placement of the guard on the reel;

Fig. 3 is a fragmentary perspective view of the retaining ring and guard of the present invention;

Fig. 4 is an enlarged fragmentary sectional view similar to Fig. 2 illustrating a modified form of a guard for the reel shown in Fig. 1;

Fig. 5 is a fragmentary perspective view of the retaining plate and guard illustrated in Fig. 4;

Fig. 6 illustrates one form of a spinning reel having secured thereto a guard made in accordance with the present invention;

Fig. 7 is a fragmentary face view of the spinning reel illustrated in Fig. 6;

Fig. 8 is an enlarged fragmentary sectional view of the periphery of the spool and the adjoining plate illustrating the method of mounting the guard on the spool;

Fig. 9 is an enlarged fragmentary sectional view similar to Fig. 8 illustrating a modified method of mounting the guard of the present invention;

Fig. 10 is a fragmentary plan view of the guard of the present invention;

Fig. 11 is a fragmentary view partially in section of a different type of spinning reel having the guard of the present invention secured thereto;

Fig. 12 is an enlarged fragmentary sectional view of a portion of the periphery of the spool and adjoining segment of the reel illustrating one method of securing the guard to the spool; and Fig. 13 is an enlarged fragmentary sectional view similar to Fig. 12 illustrating a modified form of mounting the guard between the spool and adjoining portion of the reel.

Referring more specifically to the drawings and particularly Fig. 1 thereof, reference numeral 10 designates generally a fishing reel made in accordance with the present invention comprising a pair of end plates 11, 11 held in spaced relation by a plurality of spacer bars 12. Each of the end plates 11, 11 has an inwardly extending peripheral flange 13 thereon which carries a retaining ring 14. A spool 15 is rotatably mounted between opposite end plates 11, 11 while a retaining plate or carriage 16 extends between the opposite end plates 11, 11 at the base of the reel to secure the reel to a fishing rod (not shown).

With reference to Fig. 2, the spool 15 is provided with flanges 17, 17 which extend outwardly from the spool and terminate at their peripheral edges adjacent the inwardly extending flanges of the end plates. A slight clearance space is provided between the peripheral edge of the spool flange and the inner edge of the end plate flange to permit free rotation of the spool in the reel. In a mass production model of a fishing reel this clearance space, in many instances, will be larger than the diameter of mono-filament line and thus the mono-filament line may pass between the spool flange and the end plate and become caught in the fishing reel.

In accordance with the present invention, means are provided to cover or protect this clearance space between the spool flange and the end plate to prevent the line from becoming tangled in the reel while at the same time not exerting a sufficient drag on the reel to interfere with proper casting. To this end a plastic ring formed, for example, of vinyl plastic is mounted on the reel in such a manner to prevent passage of the line through the clearance between the spool and the end plate.

In the embodiment illustrated in Figs. 2 and 3 of the drawings, a plastic ring 20 is provided which is secured, for example, by cement to the outer surface of the retaining ring 14 and extends inwardly of the reel from the retaining ring to a position overlapping the edge of the spool flange. The inner peripheral edge of the ring 20 is scored as indicated at 21 to permit the edge of the plastic ring to conform to the shape of the spool flange while the outer peripheral edge of the plastic ring 20 is cut out as indicated at 22 and 23 to receive the spacer bars 12 and the plate 16. This ring 20 is specifically designed for use on presently existing reels and the ring may be split or cut radially to facilitate insertion on the reel. In some instances, the retaining ring 14, which also serves to protect the line from bearing against the end plates is omitted, in which case the plastic ring 20 will be cemented or otherwise secured directly to the end plate flanges 13 and overlie the flange of the spool to prevent passage of the line behind the spool flange.

A modified form of the present invention is illustrated in Figs. 4 and 5 of the drawings wherein a plastic ring 25 is provided secured to the inner surface of the retaining ring 14, for example, by cement or the like. If desired, the plastic ring 25 may be clamped in position between the retaining ring 14 and the end plate flange 13. The plastic ring 25 is molded or otherwise formed with its inner peripheral edge displaced inwardly at an angle to the plane of the ring 25. When the reel is assembled, the spool flange 17 overlies the inner peripheral edge of the plastic ring 25 so that the clearance space between the spool flange and the end plate is effectively closed thereby preventing passage of the line through this clearance space. Both the plastc ring 25 and the plastic ring 20 exert very little friction on the spool 15 and thus do not interfere with rotation of the spool during casting. Figs. 6 to 13 of the drawings illustrate the use and application of the guard of the present invention on a spinning reel. In this type of reel there is a clearance gap or space provided intermediate the cylindrical flange on the end plate of the reel and the spool flange to permit free relative rotation of one of these members with respect to the other member. It is possible for the line to pass through this clearance space and become tangled. Accordingly, means must be provided to prevent such passage of the line without interfering with the relative rotation between the spool and the end plate.

In Figs. 6 to 9, inclusive, of the drawings there is shown one form of a spinning reel comprising a housing 30 having a spool 31 formed integrally with the forward surface thereof about which the line is wound. The axis of the spool 31 is concentric with the axis of the housing 30 and a circular spool flange 32 is provided at the forward end of the spool 31. An end plate 33 is mounted forwardly adjacent the spool flange 32 on a shaft 34 which may be rotated in the conventional manner by an operating handle 35.

The end plate 33 has a rearwardly extending cylindrical flange 36 thereon overlying the spool flange 32 and a clearance space is provided between the end plate flange 36 and the spool flange 32 to permit free relative rotation of the end plate with respect to the spool. To wind the line on the spool a pick-up finger 37 is moved to a projected position as shown in Fig. 7 and the end plate is rotated thereby wrapping the line around the spool.

In accordance with the present invention, a guard member or plastic ring 38 is positioned intermediate the end plate flange 36 and the spool flange 32 to prevent the line from passing through the clearance space between the flanges 36 and 32. The guard member or plastic ring 38 is similar to the rings 20 and 25 described above and, if desired, the peripheral edge thereof may be cut out as illustrated in Fig. 10 to provide a plurality of radial finger portions 39 extending across the clearance space between the flanges 36 and 32.

In Fig. 8 the guard member 38 is illustrated in a position cemented to the spool flange 32 while in Fig. 9 the guard member 38 is secured in position by being inserted in a circumferential groove 41 provided in the inner surface of the end plate flange 36.

Figs. 11, 12 and 13 illustrate a further embodiment of the present invention applied to a spinning reel 42 of the type comprising a stationary end plate 44 secured to the reel housing 43 and having a spool 45 mounted for both rotary and reciprocating movement relative to the end plate 44 during winding of the line. In this embodiment, a cylindrical flange 46 formed integrally with the end plate 44 overlies the inner spool flange 47 and a clearance space is provided between the flanges 46 and 47 to permit free rotary and reciprocating movement of the spool.

To cover this clearance space between the flanges 46 and 47 and prevent passage of the line therethrough a guard member or plastic ring 48 similar to the above mentioned guard 38 is carried by the spool flange 47 with the outer peripheral edge thereof in engagement with the inner surface of the end plate flange 46. This guard member 48 may either be cemented to the rear surface of the spool flange as shown in Fig. 12 or may be secured in a circumferential groove 49 formed in the outer edge of the spool flange as shown in Figure 13.

From the foregoing it will be observed that the present invention provides a novel guard for fishing reels which will prevent the fishing line from passing through the clearance space between the edge of the spool and the end plate and which may be installed on a fishing reel either during or after the manufacture thereof. In addition, the guards of the present invention do not exert sufficient drag on the spool to interfere with casting.

While particular embodiments of the present invention have been illustrated and described herein, it is not intended to limit the invention to such a disclosure and changes and modifications may be incorporated and embodied therein within the scope of the following claims:

I claim:

1. In a fishing reel comprising a pair of end plates mounted in spaced relation and a flanged spool rotatably carried by said end plates operable to carry a length of line, the flanges of said spool terminating in spaced relation from said end plates to provide clearance between the spool and the end plates, and a resilient generally circular guard carried by said end plate projecting radially inward therefrom into axial engagement with the outer radial surface of the spool flange to cover the clearance between the spool flange and said end plate and prevent passage of the line therethrough.

2. In a fishing reel comprising a pair of end plates mounted in spaced relation and each having an inwardly projecting peripheral flange thereon and a flanged spool rotatably carried by said end plates operable to carry a length of line, the flanges of said spool terminating in radially spaced relation inwardly of said end plate flanges to provide clearance between the spool flanges and the end plate flanges, a retaining ring mounted on each of said end plate flanges, and a resilient generally circular guard member secured to each retaining ring between each retaining ring and end plate having a portion freely projecting radially inward therefrom into axial engagement with the outer radial surface of the spool flange to cover the clearance between the spool flange and the end plate flange and prevent passage of the line therethrough.

References Cited in the file of this patent

UNITED STATES PATENTS

| | | |
|---|---|---|
| 1,547,297 | Case | July 28, 1925 |
| 2,615,649 | Flewelling | Oct. 28, 1952 |
| 2,724,563 | Shakespeare et al. | Nov. 22, 1955 |

FOREIGN PATENTS

| | | |
|---|---|---|
| 861,383 | France | Oct. 28, 1940 |
| 918,571 | France | Oct. 28, 1946 |